United States Patent
Chen et al.

(10) Patent No.: US 9,039,881 B2
(45) Date of Patent: May 26, 2015

(54) WORKING ELECTRODE, METHOD FOR FABRICATING THE SAME AND DYE-SENSITIZED SOLAR CELL CONTAINING THE SAME

(75) Inventors: Jian-Ging Chen, Taipei (TW); Nien-Tzu Liu, Taipei (TW); Kun-Long Hsieh, Taipei (TW); Hsin-Wei Chen, Taipei (TW)

(73) Assignee: Jinex Corporation Ltd., Taipei (TW)

( * ) Notice: Subject to any disclaimer, the term of this patent is extended or adjusted under 35 U.S.C. 154(b) by 402 days.

(21) Appl. No.: 12/966,537

(22) Filed: Dec. 13, 2010

(65) Prior Publication Data
US 2012/0073642 A1    Mar. 29, 2012

(30) Foreign Application Priority Data
Sep. 24, 2010 (TW) .............................. 99132311 A

(51) Int. Cl.
*C09D 5/44* (2006.01)
*H01G 9/20* (2006.01)

(52) U.S. Cl.
CPC ........... *H01G 9/2068* (2013.01); *H01G 9/2031* (2013.01); *H01G 9/2059* (2013.01); *H01G 9/2095* (2013.01); *Y02E 10/542* (2013.01)

(58) Field of Classification Search
CPC . H01G 9/2059; H01G 9/2068; H01G 9/2031; H01G 9/2095; C25D 3/02; C25D 13/12; C02D 13/22; Y02E 10/542
USPC .......................................................... 204/490
See application file for complete search history.

(56) References Cited

U.S. PATENT DOCUMENTS

2009/0101198 A1\*   4/2009   Yun et al. ...................... 136/252
2011/0100532 A1\*   5/2011   Lee et al. ...................... 156/150

FOREIGN PATENT DOCUMENTS

CN          1763261       *    4/2005

\* cited by examiner

*Primary Examiner* — Xiuyu Tai
(74) *Attorney, Agent, or Firm* — Birch, Stewart, Kolasch & Birch, LLP

(57) ABSTRACT

The present invention provides a method for fabricating a working electrode. The method comprises the following steps: providing a photoelectrode, which comprises a conductive substrate with a semiconductor material; providing a dye solution, which comprises a dye dissolved in a solvent; and applying a voltage for conducting an electrophoresis to adsorb said dye onto a surface of said semiconductor material. The method of present invention makes the dye adsorbed fast to a surface of a semiconductor material by electrophoresis, and therefore, significantly reduces the time for fabricating a dye-sensitized solar cell.

13 Claims, 3 Drawing Sheets

WORKING ELECTRODE, METHOD FOR FABRICATING THE SAME AND DYE-SENSITIZED SOLAR CELL CONTAINING THE SAME

BACKGROUND OF THE INVENTION

1. Field of the Invention

This invention is related to a method for fabricating a working electrode of a dye-sensitized solar cell; particularly, a method for fabricating a working electrode of a dye-sensitized solar cell by electrophoresis.

2. Description of the Related Art

Under the dual problems of energy shortage and environmental protection, solar energy is considered to be a potential and environment-friendly energy. Because of the high cost of crystalline silicon solar cells, the development of dye-sensitized solar cells with low-cost electricity-generating elements is getting more and more notice.

Please refer to FIG. 1, the main inner structures of a dye-sensitized solar cell 100 comprises a working electrode (anode) 110, a counter electrode (cathode) 120 and an electrolyte 130. The anode 110 comprises a conductive substrate 111 and a photo-sensitive layer 112 for receiving solar energy; on the other hand, the cathode 120 comprises a conductive substrate 121 and a catalyst layer 122 with suitable thickness. Depending on the material of the substrate 113, 123 thereof, for instance, if the substrate 113, 123 is made of materials with non-conductive or relatively bad conductive, a conductive layer 114, 124 of a conductive material may be provided on the substrate 113, 123, respectively. The photo-sensitive layer 112 contains a semiconductor material adsorbed with a photo-excited dye. The main component of the electrolyte 130 is an organic solvent containing iodine and iodine ion.

Due to the simple structure of dye-sensitized solar cells, a flexible dye-sensitized solar cell can be obtained for broad application if a plastic plate or a Ti foil is used as the substrate 113, 123. Beside, the substrate 113, 123 can also be a glass.

Briefly, a working principle of dye-sensitized solar cells is: (1) the semiconductor material in the photo-sensitive layer is excited by a photon and then makes the dye thereon into an oxidation state for releasing electrons/holes; (2) the electron moves into the conductive material of the conductive substrate and transfer out through an external circuit; (3) the dye in oxidation state is reduced to ground state by the redox pair of the electrolyte; and (4) the electron transferring through the external circuit reduces the redox pair at cathode.

In order to broaden the development of the dye-sensitized solar cell industry, it is a key technique to eliminate the fabrication process of dye-sensitized solar cells. Adsorbing the dye onto the surface of the semiconductor material is the time-consuming step in the fabrication process of dye-sensitized solar cells. The most widely used method is to immerse a photoelectrode (i.e. a conductive substrate coated with a semiconductor material such as titanium dioxide) into a dye solution. The aforementioned method takes at least 10 hours to make the dye adsorb onto the surface of the semiconductor material on the photoelectrode completely and even takes 3~5 hours to complete the adsorbing process while rising the working temperature to 50° C. Therefore, the time cost is not easy to control under this situation, and the development of dye-sensitized solar cell industry is adversely obstructed.

SUMMARY OF THE INVENTION

In view of foregoing, one object of the present invention is to provide a method for fabricating a working electrode, which comprises an improved dye-adsorbing technique for significantly reduce the time needed for dye-adsorbing.

Another object of the present invention is to provide a working electrode and a dye-sensitized solar cell containing the same, wherein the time for fabricating the same is significantly reduced by using an improved dye-adsorbing technique. Therefore, the demand for saving time cost is achieved.

To achieve the above objects, the present invention provides a method for fabricating a working electrode, comprising the following steps: providing a photoelectrode, which comprises a conductive substrate having a semiconductor material; providing a dye solution, which comprises a dye dissolved in a solvent; and applying a voltage for conducting an electrophoresis to adsorb said dye onto a surface of said semiconductor material.

The present invention also provides a method for fabricating a working electrode, comprising the following steps: providing a conductive substrate; providing a mixture, which comprises a semiconductor material adsorbed with a dye, wherein said semiconductor material adsorbed with a dye was suspended in a solvent; and applying a voltage for conducting an electrophoresis to adsorb said a semiconductor material adsorbed with a dye onto a surface of said conductive substrate.

The present invention also provides a working electrode, which is fabricated by said method.

The present invention also provides a dye-sensitized solar cell, which comprises said working electrode.

Preferably, said method further comprises providing an electrode, which forms an electrical pathway with said photoelectrode or said conductive substrate to conduct said electrophoresis.

Preferably, said semiconductor material is a semiconductor nanomaterial.

Preferably, said semiconductor nanomaterial is titanium dioxide, zinc oxide, zirconium dioxide or a combination thereof.

Preferably, a material of said conductive substrate is metal.

Preferably, said conductive substrate is a substrate having a conductive material coated on a surface thereof.

Preferably, a material of said substrate is glass, plastic or metal.

Preferably, said conductive material is indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof.

Preferably, said solvent is an organic solvent.

Preferably, said organic solvent comprises nitrile, ester, amide, alkane, alcohol or a combination thereof.

Preferably, said voltage is between 10~1000 V.

To sum up, the method of the present invention takes advantage of the principle of electrophoresis to adsorb a dye onto the surface of the semiconductor material. By applying appropriate voltage, the complete adsorption of a dye onto the surface of the semiconductor material only takes about 5 minutes. Accordingly, the method of the present invention can significantly eliminate the time for fabricating a working electrode and a dye-sensitized solar cell and promote the development of the dye-sensitized solar cell industry.

DETAILED DESCRIPTION OF THE PRESENT INVENTION

Figure 1:
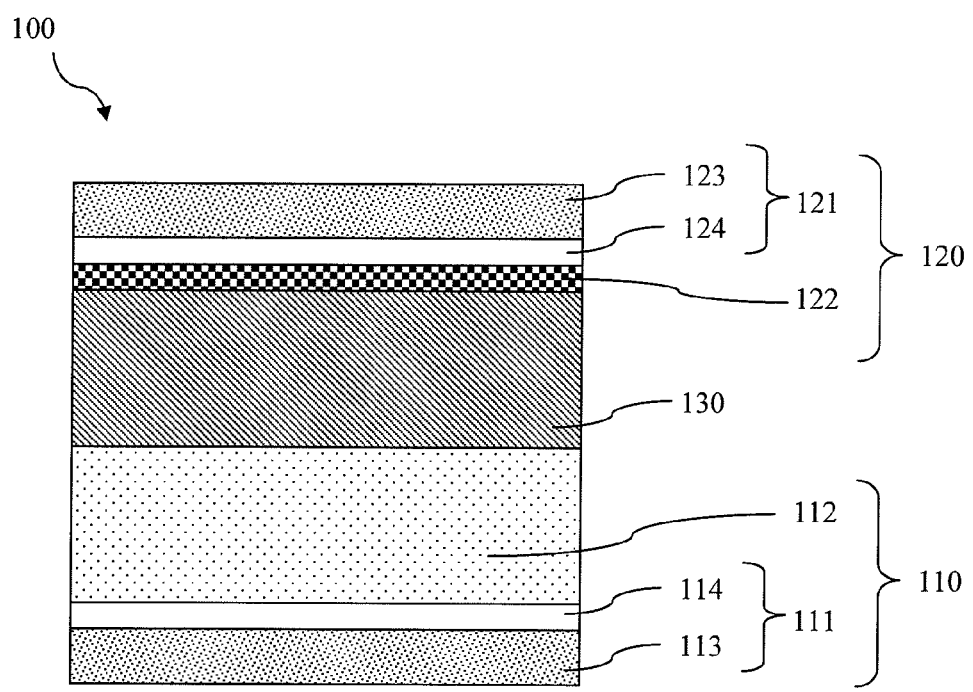
FIG. 1 shows a schematic example of layer structures of a typical dye-sensitized solar cell.

In one of the embodiment of the present invention, the method for fabricating a working electrode of the present invention comprises the following steps: first of all, providing a photoelectrode. The term "photoelectrode" used herein is referred to as a conductive substrate coated with a semiconductor material. The definition of said "conductive substrate" of the present invention is a substrate, which has a good conductive ability under a working condition of a solar cell. A substrate of said conductive substrate is an object that provides physical support for the whole conductive substrate. Said substrate includes, but not limited to glass, plastic, metal or a combination thereof. If a flexible dye-sensitized solar cell is desired, a plastic or a metal with flexibility can be used as the substrate of the conductive substrate. Said plastic includes, but not limited to polyethylene terephthalate (PET), polyethylene naphthalate (PEN) or polyimide (PI). If the substrate of said conductive substrate is made of glass or plastic, a conductive layer composed of a conductive material is provided on one surface of said substrate predetermined for coating a semiconductor material. Consequently, said conductive layer is provided between said substrate and said semiconductor material. Said conductive material includes, but not limited to: indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof. If the substrate of said conductive substrate is made of metal, a conductive layer is not necessary. A method for providing said conductive layer includes, but not limited to: vapor deposition, sputtering deposition, coating or chemical vapor deposition (CVD).

Preferably, said "semiconductor material" of the present invention is a semiconductor nanomaterial. A semiconductor material in nano-scale can increase a light-receiving area of a photoelectrode to more than 1000 times of an area of the conductive substrate thereof and thereby promote the efficiency of a dye-sensitized solar cell consequently. Said semiconductor nanomaterial includes, but not limited to titanium dioxide ($TiO_2$), zinc oxide (ZnO), zirconium dioxide ($ZrO_2$) or a combination thereof.

A method for the step "providing a photoelectrode" in the present invention is not limited, for instance, said semiconductor nanomaterial is coated onto a surface of said conductive substrate (or said conductive layer) simply by a scraper to obtain a photoelectrode; or, a semiconductor nanomaterial is provided on a surface of said conductive substrate (or said conductive layer) by electrophoresis.

Then, a dye solution, which comprises a dye dissolved in a solvent, is provided. The "dye" of the present invention is a photo-excited dye, which can be excited to release electrons/holes by solar energy. A photo-excited dye used in the present invention is not limited, for instance, Z907, N3 or N719, which is well-known in the art. Furthermore, a concentration of said dye solution of the present invention is preferably 0.05~0.5 mM.

The solvent of the present invention is referred to which can appropriately dissolve said dye to obtain a suitable dye solution for electrophoresis. Said solvent is an organic solvent. Alternatively, said solvent of the present invention comprises nitrile, ester, amide, alkane, alcohol or a combination thereof; for instance, said organic solvent is 3-methoxypropionitrile, γ-butyro lactone, N,N'-dimethylformamide, acetonitrile, pentanenitrile, N,N'-dimethylacetamide, dichloromethane, dichlorethane, dimethylsulfoxide, methanol, ethanol, propanol, isopropanol, n-butanol or a combination thereof.

It is noted that, a dye has an electric property (charge) after being dissolved in said solvent; for instance, said Z907, N3 or N719 has a negative charge after being dissolved in an appropriate solvent, thus, the dye with a negative charge will be moved toward the anode during electrophoresis.

Then, an electrophoresis apparatus is prepared, wherein said electrophoresis apparatus comprises an electrophoresis bath and an electrode (first electrode). It is appreciated by those ordinary skilled in the art that in order to conduct an electrophoresis, at least two electrodes applied with opposite voltage are needed. Accordingly, said photoelectrode is used as another electrode (second electrode) in said electrophoresis apparatus. Then, said photoelectrode and said first electrode are positioned respectively in said electrophoresis bath; wherein, the distance between said photoelectrode and said first electrode is not limited. After that, said dye solution is introduced into said electrophoresis bath; preferably, a liquid level of said dye solution in said electrophoresis bath is higher than a height of said photoelectrode and said first electrode.

Last, a voltage is applied for conducting electrophoresis; wherein, said photoelectrode is applied with a voltage which is opposite to the charge of the dissolved dye. For instance, said Z907, N3 or N719 has a negative charge after being dissolved in an appropriate solvent, therefore, said photoelectrode is applied with a positive voltage and said first electrode is applied with a negative voltage. Consequently, said photoelectrode, said first electrode and said dye solution can form an electric pathway for conducting an electrophoresis. During electrophoresis, said dye, which has a negative charge, is moved toward said photoelectrode with a positive charge and adsorbs on a surface of said photoelectrode. Accordingly, said photoelectrode, which is adsorbed with said dye, can be used as a working electrode for fabricating a dye-sensitized solar cell. Preferably, said photoelectrode adsorbed with said dye is further washed by said solvent to remove a dye that does not adsorb stably on said semiconductor material.

In another embodiment of the present invention, the method for fabricating a working electrode of the present invention comprises the following steps: first of all, an aforementioned conductive substrate is prepared. Then, a 0.05~0.5 mM dye solution and a 0.1~30 wt % semiconductor material suspension are prepared; wherein, said dye solution comprises a dye dissolved in said solvent, and said semiconductor material suspension comprises a semiconductor material suspending in said solvent. Then, said dye solution and said semiconductor material suspension are mixed together to obtain a mixture; in the mean time, said dye adsorbs onto a surface of said semiconductor material to form a semiconductor material adsorbed with a dye.

As long as said dye is made to adsorb onto surface of said semiconductor material, the method for mixing said dye solution and said semiconductor material suspension is not limited. For instance, said dye solution and said semiconductor material suspension are mixed well by stirring. It is noted that, since said semiconductor material is at a suspending state in said semiconductor material suspension, during the mixing process of the present invention, the opportunity for said dye of said dye solution to contact with said semiconductor material is much more than that of a conventional dye-adsorbing process. Thus, the time needed for adsorbing said dye onto a surface of said semiconductor material is thereby reduced.

It is noted that, a dye has an electric property (charge) after being dissolved in said solvent; for instance, said Z907, N3 or N719 has a negative charge after being dissolved in an appropriate solvent, thus, said semiconductor material adsorbed with a dye has a negative charge on surface thereof and will be moved toward the anode during electrophoresis.

Then, an aforementioned electrophoresis apparatus is prepared, wherein said electrophoresis apparatus comprises an electrophoresis bath and an electrode (first electrode). Said conductive substrate is used as another electrode (second electrode) in said electrophoresis apparatus. Then, said first electrode and second electrode are positioned respectively in said electrophoresis bath; wherein, a distance between said first electrode and second electrode is not limited. After that, said mixture is introduced into said electrophoresis bath; preferably, a liquid level thereof in said electrophoresis bath is higher than a height of said first electrode and said second electrode.

Last, a voltage is applied for conducting electrophoresis; wherein, said second electrode is applied with a voltage which is opposite to the charge of the dye. For instance, said Z907, N3 or N719 has a negative charge after being dissolved in an appropriate solvent, therefore, said second electrode is applied with a positive voltage and said first electrode is applied with a negative voltage. Consequently, said first electrode, said second electrode and said dye solution can form an electric pathway for conducting an electrophoresis. During electrophoresis, said semiconductor material adsorbed with a dye, which has a negative charge, is moved toward said second electrode (i.e. said conductive substrate) with a positive charge and adsorbs on a surface of said second electrode to form a photo-sensitive layer. Accordingly, said conductive substrate, which is provided with said photo-sensitive layer by electrophoresis, can be used as a working electrode for fabricating a dye-sensitized solar cell.

In a prefer embodiments, a first mixture and a second mixture are prepared, wherein said first mixture comprises a semiconductor material adsorbed with a first dye, and said second mixture comprises a semiconductor material adsorbed with a second dye. During electrophoresis, said first mixture is first introduced in said electrophoresis bath for electrophoresis, and said semiconductor material adsorbed with a first dye adsorbs on said conductive substrate to form a first photo-sensitive layer. After that, said second mixture is then introduced in for electrophoresis, and said semiconductor material adsorbed with a second dye adsorbs on said first photo-sensitive layer to form a second photo-sensitive layer. Accordingly, a working electrode having at least one photo-sensitive layer can be prepared fast by using the method of the present invention, wherein every photo-sensitive layer may has different dyes. In this way, an absorption band of a dye-sensitized solar cell of the present invention can be broadened.

In another embodiment of the present invention, a dye-sensitized solar cell containing a working electrode of the present invention is disclosed. Said dye-sensitized solar cell also has a counter electrode, which comprises a conductive substrate; alternatively, further comprises a catalyst layer. Said conductive substrate is defined as above. A material of said catalyst layer is referred to well-known catalyst layers of dye-sensitized solar cells and is not limited, for example, a metal catalyst or a non-metal catalyst. Said metal catalyst includes, but not limited to platinum; said non-metal catalyst includes, but not limited to cobalt sulfide, nickel sulfide, ferric sulfide or a combination thereof. A method for providing said catalyst layer on said conductive substrate to prepare a counter electrode (cathode) of the present invention is well-known in the art, which includes, but not limited to vacuum coating.

An electrolyte of the dye-sensitized solar cell of the present invention comprises an organic solvent containing iodine and iodine ion. Said organic solution containing iodine and iodine ion is well-known in the art and is not limited. For instance, 1-Butyl-3-methyl-midazolium iodide (BMImI) is used for providing iodine ions. An organic solvent used includes, but not limited to acetonitrile, 3-methoxypropionitrile (MPN), γ-butyro lactone (GBL), N,N'-dimethylformamide, N,N'-dimethylacetamide or dimethylsulfoxide.

Said electrolyte of the present invention can be further included 4-tert-butylpyridine (TBP) for improving the open-circuit voltage of a dye-sensitized solar cell and effectively promoting the efficiency of a cell, guanidinium thiocyanate (GuSCN) for increasing the photovoltage of a dye-sensitized solar cell and/or 1-methyl-1H-benzimidazole (NMBI) for modifying the properties of titanium dioxide and improving the efficiency of a cell. A packaging material of a dye-sensitized solar cell of the present invention is not limited; basically, is a well-known thermoplastic membrane or UV gel.

In regard to packaging a dye-sensitized solar cell of the present invention, briefly, said packaging material is positioned between said working electrode and said counter electrode. Then, UV light or heat is applied to cure and steady said packaging material with said working electrode and said counter electrode. After that, said electrolyte is introduced and filled with an inner space defined by said packaging material, said working electrode and said counter electrode. A dye-sensitized solar cell of the present invention is obtained accordingly.

The following examples are used to further realize the advantages of the present invention but not intended to limit the claim of the present invention. Furthermore, the following drawings are merely used for illustrating the working relationship between elements in the method of the present invention but not intended to limit the operation of the method of the present invention and the scale of said elements.

Example 1

Fabrication of a Working Electrode of the Present Invention

In this example, sample 1~5 were fabricated by the method of the present invention, wherein, parameters of said sample 1~5 were listed in the table 1 below:

TABLE 1

| | parameters of said sample 1~5 | | | | |
|---|---|---|---|---|---|
| | sample | | | | |
| | 1 | 2 | 3 | 4 | 5 |
| conductive substrate | Ti foil | glass/FTO | PET/ITO | Ti foil | Ti plate |
| semiconductor nanomaterial | $TiO_2$ | $TiO_2$ | $TiO_2$ | $TiO_2$ | $TiO_2$ |
| photo-excited dye | N719 | Z907 | N719 | N3 | N719 |
| solvent | dichloromethane | acetonitrile | n-butanol | pentanenitrile | ethanol + acetonitrile |
| voltage | 50 V | 100 V | 20 V | 250 V | 500 V |
| electrophoresis time (minute) | 4 | 5 | 7 | 4 | 3 |

Except for the parameters listed in table 1 above, all samples were fabricated in a same method according to the present invention. Briefly, taking sample 1 as an example, a Ti foil (a flexible Ti plate) was first prepared. Because titanium is a metal with good conductive, there is no need to provide a conductive layer. Then, a layer of titanium dioxide ($TiO_2$) with a thickness of about 15 μm was uniformly coated on a surface of said Ti foil by using a scraper, and a $TiO_2$ photoelectrode was therefore obtained. Said $TiO_2$ photoelectrode was then cut into 1.5 cm×2 cm (by length×width) and heated in a furnace at 500° C. for 30 minutes to enhance the connection between $TiO_2$ nanoparticles.

After that, 0.036 gram N719 dye was added and dissolved in 100 ml dichloromethane by stirring appropriately to obtain a dye solution with a concentration of 0.3 mM.

Figure 2:
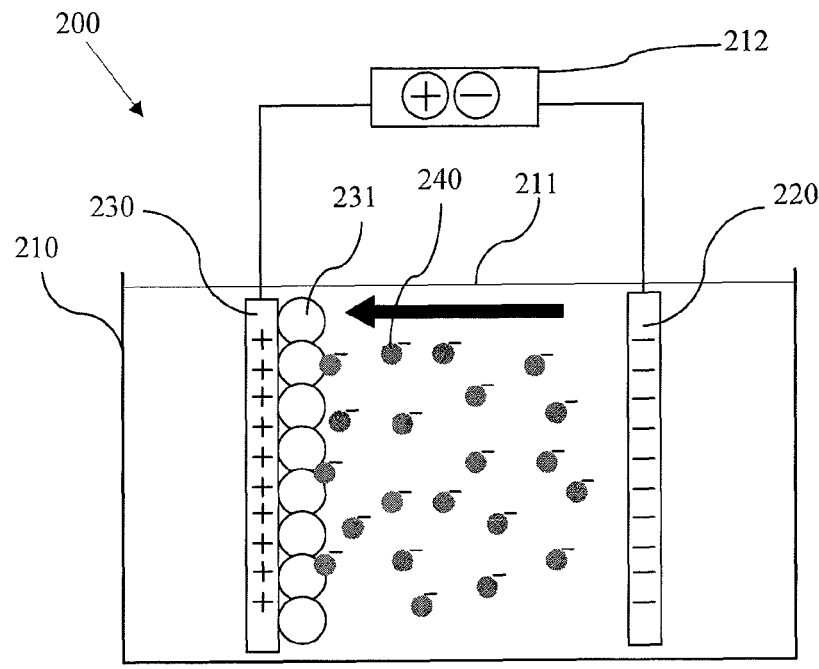
FIG. 2 shows a schematic example of an electrophoresis apparatus used in the example 1 of the present invention.

Please refer to FIG. 2, an electrophoresis apparatus 200, which comprised an electrophoresis bath 210 and a first electrode 220, was then prepared. Said first electrode 220 and said photoelectrode (second electrode) 230 were positioned in said electrophoresis bath. In this example, a distance between said first electrode 220 and said photoelectrode 230 was about 1 cm. Next, said dye solution was introduced into said electrophoresis bath 210, and a liquid level 211 thereof was over said first electrode 220 and said photoelectrode 230. Then, a power supply 212 was connected to said first electrode 220 and said photoelectrode 230 to form an electrical pathway. Since the dye 240 in said dye solution had a negative charge, said photoelectrode 230 was applied with a positive voltage and said first electrode 220 was applied with negative voltage. Accordingly, said dye 240 was moved toward the anode (that is, said photoelectrode 230) by electrophoresis, as the direction pointed by the arrow in the figure, and adsorbed on a surface of a semiconductor nanomaterial (such as $TiO_2$ nanoparticles) 231 of said photoelectrode 230.

Said voltage was applied continuously for about 4 minutes until said dye 240 adsorbed on said semiconductor nanomaterial 231 to a desired extent; preferably, until said dye 240 completely covered the surface of said semiconductor nanomaterial 231. Then, said photoelectrode 230, that is a working electrode of sample 1 of this example, was taken out from said electrophoresis bath and washed by dichloromethane to remove a dye 240, which did not adsorb stably on said semiconductor nanomaterial 231.

Samples 2~5 of this example were fabricated in accordance with the method above except for substituting the parameters listed in table 1.

Example 2

Fabrication and Testing Results for a Dye-sensitized Solar Cell of the Present Invention The working electrodes obtained in example 1 were used for fabricate dye-sensitized solar cells. In this example, an exemplary description was made by using the working electrodes of samples 2 and 5.

First of all, a counter electrode of a dye-sensitized solar cell was prepared. Polyethylene naphthalate (PEN) was chosen as a substrate of a conductive substrate of said counter electrode, and ITO was provided on a surface of said substrate to form a conductive layer by chemical vapor deposition (CVD). After that, a platinum layer, as a catalyst layer (thickness thereof was about 1 nm), was formed on said conductive layer by vacuum coating. Accordingly, a counter electrode of this example was obtained.

Next, an electrolyte used in this example was an organic solvent containing iodine and iodine ion; specifically, an electrolyte with 0.1 M of LiI, 0.03 M of $I_2$, 0.05 M of TBP, 0.6 M of BMImI, 0.1 M of GuSCN and 0.1 M of NMBI dissolved in a MPN/GBL solvent.

Last, a SX-1170-25 thermoplastic membrane (Solaronix) was used as a packaging material. Said thermoplastic membrane was positioned between said working electrode of sample 5 and said counter electrode and heated at about 100° C. Also, an appropriated pressure was applied to make said working electrode and said counter electrode adhere with said thermoplastic membrane respectively. Then, said electrolyte was introduced and filled into an inner space defined by said thermoplastic membrane, said working electrode and said counter electrode. Consequently, a dye-sensitized solar cell in this example, which contains said working electrode of sample 5 was obtained.

In order to examine the performance of the dye-sensitized solar cell fabricated by the method of the present invention, said dye-sensitized solar cell was tested at AM1.5 (defined as a light intensity while sunlight passes through the atmosphere and has a angle of 45° with earth surface) and under a light exposure of 100 mw/cm².

Figure 3:
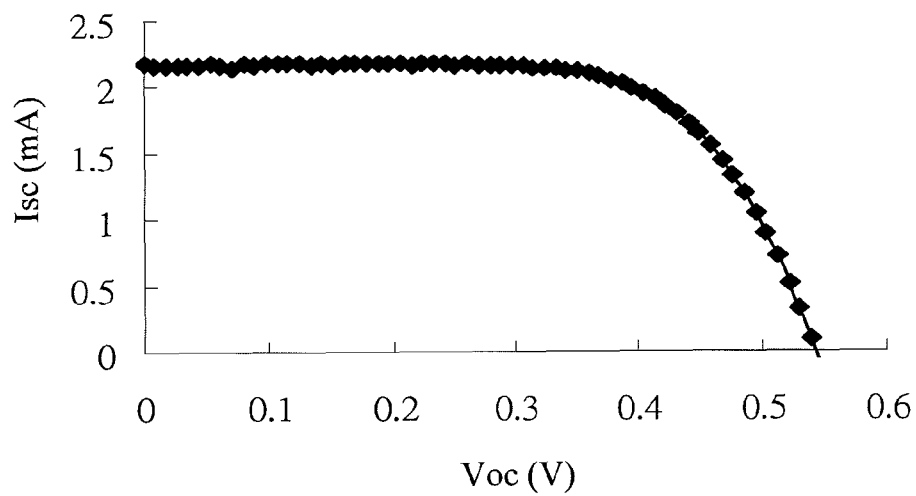
FIG. 3 displays an I-V curve of a dye-sensitized solar cell of the example 5 of the present invention.

First, please refer to FIG. 3, which displays an I-V curve of the dye-sensitized solar cell of sample 5. According to the rectangle area defined by the I-V curve, Y-axis and X-axis in the figure, it is found that said dye-sensitized solar cell of sample 5 has good performance. Moreover, base on the following table 2, the performance of said dye-sensitized solar cell of sample 5, such as open circuit voltage (VOC), short circuit current density (JSC), fill factor (FF) and efficiency (η) all have good quality.

TABLE 2

Performance of a dye-sensitized solar cell containing a working electrode of sample 5

| dye-sensitized solar cell | Voc (v) | Jsc (mA) | FF (—) | η (%) |
| --- | --- | --- | --- | --- |
| Sample 5 | 0.54 | 2.169 | 0.674 | 3.157 |

Next, a dye-sensitized solar cell containing a working electrode of sample 2 was fabricated by the aforementioned method. Also, a dye-sensitized solar cell of a comparison 1 was fabricated by using conventional dye-adsorbing process, wherein components of a working electrode thereof were listed in the following table 3:

TABLE 3

| a working electrode of comparison 1 | | | | |
| --- | --- | --- | --- | --- |
| | conductive substrate | semiconductor nanomaterial | photo-excited dye | dye-adsorbing process |
| Comparison 1 | glass/FTO | $TiO_2$ | Z907 | immersing |

It is noted that, except for the dye-adsorbing process, the fabrication processes of dye-sensitized solar cells of said comparison 1 and said sample 2 were the same.

Then, the performance was tested at AM1.5 (defined as a light intensity while sunlight passes through the atmosphere and has a angle of 45° with earth surface) and under a light exposure of 100 mw/cm² for comparing the performance difference of sample 2 and comparison 1.

Figure 4:
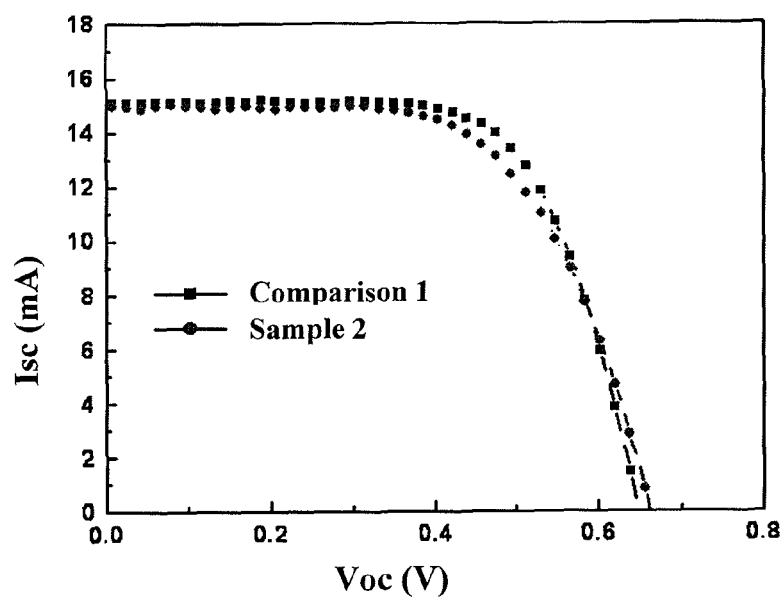
FIG. 4 displays I-V curves of dye-sensitized solar cells of comparison 1 and the sample 2 of the present invention.

Please refer to FIG. 4, the performance of the two dye-sensitized solar cells do not have significant difference in accordance with the I-V curve. It is further demonstrated in the following table 4 that the dye-sensitized solar cell of sample 2 of the present invention not only has an advantage of short fabrication time but also has performance almost as same as that of the dye-sensitized solar cell of comparison 1.

TABLE 4

Performance comparing between dye-sensitized solar cells of comparison 1 and sample 2

| dye-sensitized solar cell | Voc (v) | Jsc (mA) | FF (—) | η (%) |
|---|---|---|---|---|
| Comparison 1 | 0.644 | 15.16 | 0.682 | 6.66 |
| Sample 2 | 0.659 | 14.90 | 0.636 | 6.25 |

Example 3

Fabrication of a Working Electrode of the Present Invention

A method for fabricating a working electrode of this example was described briefly as follows: first, a Ti foil was prepared. Because titanium is a metal with good conductive, there is no need to provide a conductive layer. Then, said Ti foil was cut into 1.5 cm×2 cm (by length×width) and served as a conductive substrate of this example.

Then, a titanium dioxide suspension with a concentration of 0.5 wt % was prepared by adding titanium dioxide into a 50 ml isopropanol. Also, a dye solution with a concentration of 0.3 mM was prepared by dissolving 0.036 gram N719 dye into 100 ml ethanol. After that, said titanium dioxide suspension and said dye solution were mixed to obtain a mixture. Said mixture was stirred continuously for about 10 minutes to let said dye adsorb on said titanium dioxide to a desired extent.

Figure 5:
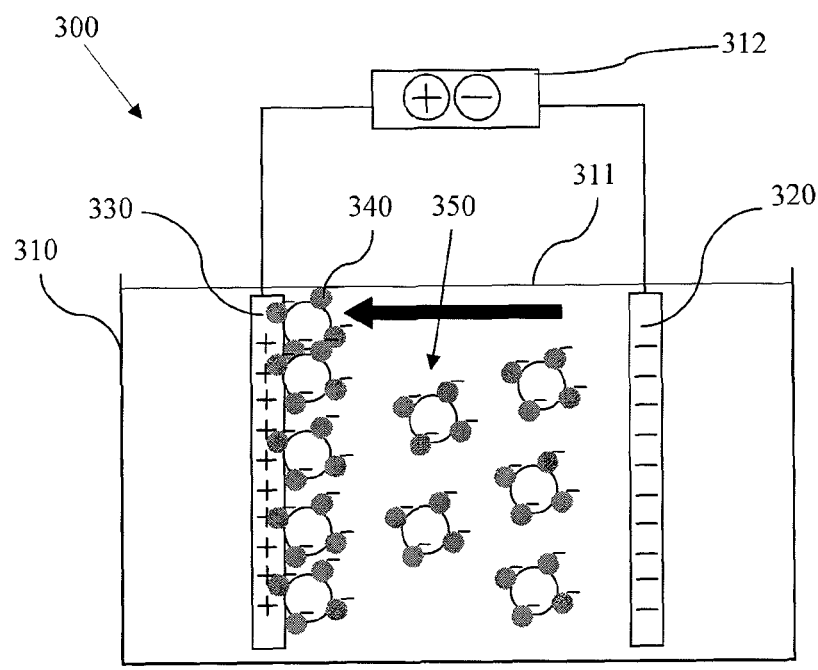
FIG. 5 shows a schematic example of an electrophoresis apparatus used in the example 3 of the present invention.

Next, please refer to FIG. 5, an electrophoresis apparatus 300, which comprised an electrophoresis bath 310 and a first electrode 320, was prepared. Said first electrode 320 and said conductive substrate (second electrode) 330 were positioned into said electrophoresis bath 310. A distance between said first electrode 320 and said conductive substrate 330 was 1 cm. Then, said mixture was introduced into said electrophoresis bath 310 and a liquid level 311 thereof was over said first electrode 320 and said conductive substrate 330. After that, a power supply 312 was connected with said first electrode 320 and said conductive substrate 330 to form an electrical pathway. A titanium dioxide adsorbed with a dye 350 in said mixture had a negative charge due to said dye 340 adsorbing on the surface thereof, therefore, said conductive substrate 330 was applied with a positive voltage and said first electrode 320 was applied with negative voltage. Accordingly, said titanium dioxide adsorbed with a dye 350 was moved toward the anode (that is, said conductive substrate 330) by electrophoresis, as the direction pointed by the arrow in the figure, and adsorbed on a surface of said conductive substrate 330.

Said voltage was applied continuously for about 5 minutes until said titanium dioxide adsorbed with a dye 350 adsorbed on said conductive substrate 330 to a desired extent; preferably, until said titanium dioxide adsorbed with a dye 350 completely covered the surface of said conductive substrate 330. Then, said conductive substrate 330, that is a working electrode of this example, was taken out from said electrophoresis bath and washed by dichloromethane to remove a titanium dioxide adsorbed with a dye 350, which did not adsorb stably.

The embodiments and the technical principles used are described above. All variations and modifications of the present invention and the uses thereof are included in the scope of the present invention if they do not depart from the spirit of the disclosure of this specification and drawings.

What is claimed is:

1. A method for fabricating a working electrode, comprising the following steps:
    (a) providing a photoelectrode, which comprises a conductive substrate having a semiconductor material; providing a dye solution consisting of a dye and a solvent;
    (b) putting said photoelectrode into an electrophoresis bath and introducing said dye solution into said electrophoresis bath; and
    (c) applying a voltage for conducting an electrophoresis to adsorb said dye onto a surface of said semiconductor material.

2. The method according to claim 1, further comprising providing an electrode, which forms an electrical pathway with said photoelectrode to conduct said electrophoresis.

3. The method according to claim 1, wherein said semiconductor material is a semiconductor nanomaterial.

4. The method according to claim 3, wherein said semiconductor nanomaterial is titanium dioxide, zinc oxide, zirconium dioxide or a combination thereof.

5. The method according to claim 1, wherein a material of said conductive substrate is metal.

6. The method according to claim 1, wherein said conductive substrate is a substrate having a conductive material coated on a surface thereof.

7. The method according to claim 6, wherein a material of said substrate is glass, plastic or metal.

8. The method according to claim 6, wherein said conductive material is indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof.

9. The method according to claim 1, wherein said solvent is an organic solvent.

10. The method according to claim 9, wherein said organic solvent comprises nitrile, ester, amide, alkane, alcohol or a combination thereof.

11. The method according to claim 1, wherein said voltage is between 10~1000 V.

12. A working electrode, which is fabricated by the method of claim 1.

13. A dye-sensitized solar cell, which comprises the working electrode of claim 12.

* * * * *